United States Patent
Asahara et al.

[11] 3,885,974
[45] May 27, 1975

[54] SEALING GLASS FOR LASER GLASS

[75] Inventors: Yoshiyuki Asahara, Kawasaki; Tetsuro Izumitani, Hino, both of Japan

[73] Assignee: Hoya Glass Works, Limited, Tokyo, Japan

[22] Filed: July 30, 1973

[21] Appl. No.: 383,743

[30] Foreign Application Priority Data
Oct. 9, 1972  Japan.............................. 47-101367

[52] U.S. Cl. ............................................ 106/47 Q
[51] Int. Cl......... C03c 3/12; C03c 3/16; C03c 3/30
[58] Field of Search..... 106/47 Q, 47 R; 117/124 A, 117/125

[56] References Cited
UNITED STATES PATENTS

| | | | |
|---|---|---|---|
| 2,278,501 | 4/1942 | Tillyer et al...................... | 106/47 R |
| 2,359,789 | 10/1944 | Pincus.............................. | 106/47 R |
| 2,381,925 | 8/1945 | Pincus.............................. | 106/47 R |
| 3,043,702 | 7/1962 | Brömer et al..................... | 106/47 Q |
| 3,126,295 | 3/1964 | Young.............................. | 106/47 R |
| 3,341,453 | 9/1967 | Ralston............................ | 106/47 R |

*Primary Examiner*—Winston A. Douglas
*Assistant Examiner*—Mark Bell
*Attorney, Agent, or Firm*—Sughrue, Rothwell, Mion, Zinn and Macpeak

[57] ABSTRACT

A sealing glass for laser glass produced by adding $V_2O_5$ 0–18 mol.%, $Fe_2O_3$ 0–18 mol.%, ($V_2O_5+Fe_2O_3$ 5–18 mol.%), $Co_2O_3$ 0–6 mol.% and NiO 0–7 mol.% to a balancing amount of a base glass composed of $P_2O_5$ 70–30 mol.%, $B_2O_3$ 0–15 mol.%, $Al_2O_3$ 0–5 mol.%, ($P_2O_5+B_2O_3+Al_2O_3$ 30–70 mol.%), PbO 0–55 mol.%, $Tl_2O$ 0–55 mol.%, ZnO 5–50 mol.%, (PbO+$Tl_2O$ 20–55 mol.%; PbO+$Tl_2O$+ZnO 25–60 mol.%) and BaO 0–10 mol.%.

3 Claims, 1 Drawing Figure

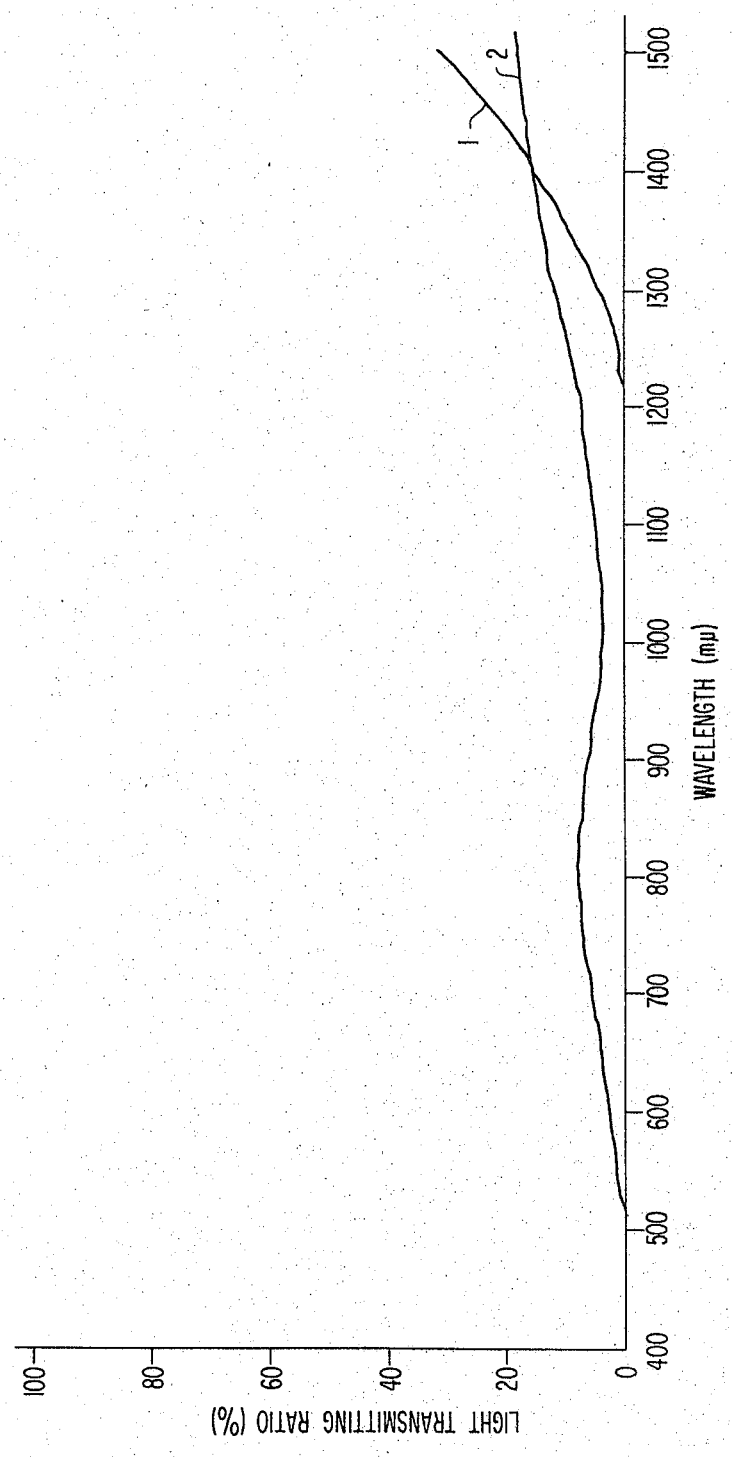

SEALING GLASS FOR LASER GLASS

BACKGROUND OF THE INVENTION

1. Field of the Invention

This invention relates to a sealing glass for laser glass which has a low optical absorption coefficient and a low melting point and which is capable of absorbing infrared rays.

2. Description of the Prior Art

Recently, it has been reported that laser glass discs can be covered with a sealing glass at their outer periphery to absorb light scattered by the inner wall of the discs and thereby improve the characteristics of the laser glass discs. Such a sealing glass is required to have an expansion coefficient equal to that of the laser glass and to be able to seal at a temperature below the transition temperature (Tg) of the laser glass. In addition, the sealing glass must have an absorption coefficient which prevents the reflection of light of the desired wavelength, and have an absorption curve to absorb the light scattered by the inner wall of the discs. For example, the sealing glass must absorb at least light of a 1.06 $\mu$ wavelength to prevent reflection of light by the inner wall of an Nd laser glass; preferably the sealing glass has an absorption coefficient higher than that of the normal laser glass (about 1.6) and the difference between the absorption coefficients is preferably smaller than 10% of the absorption coefficient of the laser glass. Further, the sealing glass must have a softening point at least 100°C lower than the transition point of the laser glass so as to not change the characteristics of the laser glass during sealing.

Conventional low melting point glasses, i.e., a $B_2O_3$-$Tl_2O$-ZnO glass or a $B_2O_3$-PbO-ZnO glass, must exhibit an absorption coefficient ($n_d$) of more than 1.8–1.9 to have a softening point in the range of 400°–500°C and to equalize their expansion coefficient with that of the laser glass ($100\pm20$) $\times$ $10^{-7}$/°C. This high $n_d$ value is not suitable for sealing laser glass.

SUMMARY OF THE INVENTION

This invention has been made based on the discovery that a $P_2O_5$-ZnO-$Tl_2O$ glass and a $P_2O_5$-ZnO-PbO glass exhibit a low $n_d$ value, a low melting point and an expansion coefficient ($\alpha$) almost equal to that of a laser glass, and are suitable for use as a sealing glass. These glasses containing $P_2O_5$ as the primary component have the further advantage that they are capable of containing large amounts of oxides of transition elements, e.g., $V_2O_5$ or $Fe_2O_3$, as infrared absorbing compounds.

BRIEF EXPLANATION OF ACCOMPANIED DRAWING

The FIGURE shows the relationship between the wavelength of light and the transmission of the glass of this invention, in which curve 1 shows the relationship for glass specimen 11 and curve 2 shows the relationship for glass specimen 15.

DETAILED DESCRIPTION OF THE INVENTION

The glass of this invention for sealing a laser glass is produced by adding $V_2O_5$ 0–18 mol.%, $Fe_2O_3$ 0–18 mol.%, ($V_2O_5$+$Fe_2O_3$ 5–18 mol.%), $Co_2O_3$ 0–6 mol.% and NiO 0–7 mol.% to a balancing amount of a base glass (to make 100 mol.%) composed of $P_2O_5$ 70–30 mol.%, $B_2O_3$ 0–15 mol.%, $Al_2O_3$ 0–5 mol.%, ($P_2O_5$+$B_2O_3$+$Al_2O_3$ 30–70 mol.%),PbO 0–55 mol.%, $Tl_2O$ 0–55 mol.%, ZnO 5–50 mol.%, (PbO+$Tl_2O$ 20–55 mol.%; PbO+$TL_2O$+ZnO 25–60 mol.%) and BaO 0–10 mol.%.

Table 1 shows several $P_2O_5$-PbO-ZnO glasses and their physical properties.

Table 1

| Specimen No. | Composition (mol.%) | | | Expansion Coefficient ($\times 10^{-7}$/°C) | Transition Temp. (°C) | Softening Point (°C) | Absorption Coefficient |
|---|---|---|---|---|---|---|---|
| | $P_2O_5$ | PbO | ZnO | | | | |
| 1 | 70 | 30 | — | 131 | 280 | 300 | 1.60 |
| 2 | 58.8 | 41.2 | — | 153 | 240 | 255 | 1.66 |
| 3 | 50 | 50 | — | 171 | 295 | 310 | 1.72 |
| 4 | 50 | — | 50 | 84.5 | 340 | 380 | 1.53 |
| 5 | 40 | 40 | 20 | 132 | 325 | 345 | 1.74 |
| 6 | 50 | 30 | 20 | 121 | 305 | 325 | 1.66 |
| 7 | 50 | 20 | 30 | 116 | 310 | 330 | 1.62 |
| 8 | 40 | 20 | 40 | 119 | 345 | 367 | 1.66 |

Each expansion coefficient was measured in the temperature range of 100°–200°C; each absorption coefficient is that for the $\alpha$ line and was in the range of 1.60–1.75; and each softening point was in the range of 300°–400°C. These physical properties are suitable for sealing laser glass.

Table 2A shows several glass compositions according to this invention produced by adding the infrared absorbing compounds to the $P_2O_5$ containing base glass, and Table 2B gives their physical properties.

Table 2A

| Specimen No. | Base Glass Composition (mol.%) | | | | | Added Compounds (mol.%) | | Expansion Coefficient ($\times 10^{-7}$/°C) |
|---|---|---|---|---|---|---|---|---|
| | $P_2O_5$ | PbO | $Tl_2O$ | ZnO | $Al_2O_3$ | $V_2O_5$ | $Fe_2O_3$ | |
| 1 | 45 | 30 | — | 20 | 5 | 5 | — | 101 |
| 2 | 45 | 30 | — | 20 | 5 | 10 | — | 98.1 |
| 3 | 47.5 | 20 | — | 30 | 2.5 | 15 | — | 90.9 |
| 4 | 49 | 20 | — | 30 | 1 | 5 | — | 102 |
| 5 | 49 | 20 | — | 30 | 1 | 10 | — | 91.2 |
| 6 | 50 | 30 | — | 20 | — | — | 5.8 | 106 |
| 7 | 50 | 30 | — | 20 | — | — | 10.6 | 108 |
| 8 | 50 | 30 | — | 20 | — | — | 15.0 | 88.6 |
| 9 | 66.6 | 16.7 | — | 16.7 | — | 11.1 | 3.1 | 97.0 |
| 10 | 64.4 | 16.7 | — | 16.7 +BaO 5.6 | 2.2 | 11.1 | — | 92.0 |
| 11 | 64.4 | 13.9 | — | 13.9 | 2.2 | 11.1 | — | 96.0 |
| 12 | 55.8 | 28.9 | — | 13.2 | 2.2 | 5.3 | — | 103 |
| 13 | 64.7 | 23.5 | — | 11.8 | — | 17.6 | — | 105 |

Table 2A — Continued

| Specimen No. | Base Glass Composition (mol.%) | | | | | Added Compounds(mol.%) | | | Expansion Coefficient ($\times 10^{-7}/°C$) |
|---|---|---|---|---|---|---|---|---|---|
| | $P_2O_5$ | PbO | $Tl_2O$ | ZnO | $Al_2O_3$ | $V_2O_5$ | $Fe_2O_3$ | | |
| | | | | | *$B_2O_3$ | | | | |
| 14 | 52.9 | 23.5 | — | 11.8 | 11.8 | 17.6 | — | | — |
| 15 | 48.0 | 40 | — | 10 | 2 | 15 | — | | 99.7 |
| 16 | 63 | 30 | — | 5 | 2 | 10 | — | | 104 |
| 17 | 48 | 50 | — | 5 | 2 | 10 | — | | 118 |
| 18 | 48 | 30 | 10 | 10 | 2 | 10 | — | | 114 |
| 19 | 48 | 20 | 20 | 10 | 2 | 10 | — | | — |
| 20 | 48 | — | 40 | 10 | 2 | 10 | — | | — |

*Specimen 14 contains $B_2O_3$ 11.8 mol.% instead of $Al_2O_3$.

Table 2B

| Specimen No. | Tg (°C) | Sp (°C) | Light Transmitting Ratio(%) | | Thickness (mm) |
|---|---|---|---|---|---|
| | | | 600 m$\mu$ | 1000 m$\mu$ | |
| 1 | 400 | 420 | 2 | 4 | 0.52 |
| 2 | 406 | 432 | 0 | 0 | 3.07 |
| 3 | 410 | 435 | 0 | 0 | 0.52 |
| 4 | 380 | 405 | — | — | — |
| 5 | 400 | 425 | — | — | — |
| 6 | 370 | 392 | 17 | 15 | 3.06 |
| 7 | 400 | 420 | 2 | 3.5 | 3.05 |
| 8 | 425 | 450 | 9 | 21 | 0.57 |
| 9 | 432 | 465 | — | — | — |
| 10 | 432 | 462 | — | — | — |
| 11 | 437 | 467 | — | — | — |
| 12 | 405 | 432 | — | — | — |
| 13 | 430 | 455 | — | — | — |
| 14 | — | 430 | — | — | — |
| 15 | 405 | 425 | — | — | — |
| 16 | 410 | 435 | — | — | — |
| 17 | 390 | 405 | — | — | — |
| 18 | 362 | 380 | — | — | — |
| 19 | 332 | 335 | — | — | — |
| 20 | 305 | 320 | — | — | — |

According to the accompanying drawing showing light transmitting curve 1 for Specimen 11 and curve 2 for Specimen 15, sealing glass 11 does not transmit light of less than 1200 m$\mu$ in wavelength and the transmission ratio of glass specimen 15 is sharply reduced for light having a wavelength of about 1000 m$\mu$. The expansion coefficient of these glasses lies in the range of $(100\pm20) \times 10^{-7}$ /°C, and the softening point lies in the range of 320–467°C, which is suitable for sealing work carried out at 450°–600°C. In addition, the chemical durability of the glass is improved by the addition of the transition elements.

Some of the phosphate glasses of this invention containing both $Fe_2O_3$ and $Co_2O_3$ and/or NiO are useful as low melting point black glasses. Some examples thereof are shown in Table 3.

ble and the absorption coefficient is undesirably increased. On the other hand, if either the $Tl_2O$ content or the PbO content is not more than 10 mol.% the softening point of the resulting glass is too high to be useful as a low melting point glass. In a system containing ZnO, i.e., where the content of PbO, $Tl_2O$ and ZnO is not more than 25 mol.%, if only PbO is added without adding $Tl_2O$ (the ZnO content is 15 mol.% and the PbO content is not more than 10 mol.%), a high melting point glass is obtained, and the resulting glass is not useful. Thus, if PbO is used alone, a glass having a content of PbO not more than 10 mol.% is not useful since a high melting point glass is obtained. If $Tl_2O$ is used alone, the same effect as in the above case is observed.

If the ZnO content exceeds 50 mol.%, the softening point of the resulting glass is too high to be useful as a low melting point glass, whereas a ZnO content less than 5 mol.% increases the absorption coefficient too much. The sum of the PbO, $Tl_2O$ and ZnO content must be 60 mol.% or lower to make the resulting glass stable. If the content of PbO, $Tl_2O$ and ZnO is not more than 25 mol.%, the acid resistance is poor and the softening point is high.

If necessary, less than 10 mol.% of BaO may be added to the glass composition. The addition of BaO to the glass makes the glass stable, but it does not directly influence the thermal properties, e.g., $\alpha$, Tg, Sp (softening point), $n_d$, etc.

An addition of more than 18 mol.% $V_2O_3$ or of more than 18 mol.% $Fe_2O_3$ increases the softening point of the glass and renders the resulting glass unstable. The sum of $V_2O_5$ and $Fe_2O_3$ must exceed 5 mol.% to obtain the infrared absorbing property.

The addition of more than 6 mol.% $Co_2O_3$ or of more than 7 mol.% NiO, respectively, make the resulting Table 3

| Specimen No. | Base Glass (mol.%) | | | Added Compounds (mol.%) | | | | Expansion Coefficient ($\times 10^{-7}/°C$) | Tg (°C) | Sp (°C) |
|---|---|---|---|---|---|---|---|---|---|---|
| | $P_2O_5$ | PbO | ZnO | $V_2O_5$ | $Fe_2O_3$ | $Co_2O_3$ | NiO | | | |
| 21 | 50 | 20 | 30 | — | 10 | — | 6.5 | — | — | — |
| 22 | 50 | 20 | 30 | — | 10 | 5.8 | — | 86.2 | 430 | 455 |
| 23 | 49.4 | 20.2 | 30.4 | — | 10.2 | 2.9 | 4.4 | 94.4 | 435 | 462 |
| 24 | 66.6 | 16.7 | 16.7 | 11.1 | 3.1 | 2.0 | — | 91.7 | 415 | 440 |

The amount of each component in the sealing glass is restricted in the ranges as described in the claims for the reasons set out below.

If the $P_2O_5$ content in the glass exceeds 70 mol.%, the chemical durability of the latter is diminished, whereas if the $P_2O_5$ content is reduced below 30 mol.% the resulting glass becomes unstable. Up to 15 mol.% of $P_2O_5$ can be substituted for by 0–15 mol.% of $B_2O_3$ or 0–5 mol.% of $Al_2O_3$.

If the $Tl_2O$ content or the PbO content exceeds 55 mol.%, respectively, the resulting glass becomes unstaglass unstable.

The glass composition is formed into a frit and mixed with a suitable organic vehicle. This mixture is coated on the surface of the laser glass and heated thereon to seal the latter. The glass compositions are formed using standard techniques. For instance, with the material of Example 18, glass frits resulting from grinding glass pieces in a mortor for 30 minutes were dispersed into a mixed vehicle of amyl acetate and cellulose nitrate to form a paste-like material. The resulting paste-like material was applied to a surface of the glass and then left at 470°C for 3 hours. As a result, a suitable sealing effect was obtained, the thickness of the sealing layer being approximated to be about 200 μ.

While this invention has been described with reference to particular embodiments thereof, it will be understood that the numerous modifications may be made by those skilled in the art without actually departing from the scope of the invention.

Therefore, the appended claims are intended to cover all such equivalent variations as coming within the true spirit and scope of this invention.

What is claimed is:

1. A sealing glass for laser glass produced by adding $V_2O_5$ 0–18 mol.%, $Fe_2O_3$ 0–18 mol.%, ($V_2O_5+Fe_2O_3$ 5–18 mol.%), $Co_2O_3$ 0-6 mol.% and NiO 0–7 mol.% to a balancing amount of a base glass consisting of $P_2O_5$ 70–30 mol.%, $B_2O_3$ 0–15 mol.%, $Al_2O_3$ 0–5 mol.%, ($P_2O_5+B_2O_3+Al_2O_3$ 30–70 mol.%), PbO 0–55 mol.%, $Tl_2O$ 0–55 mol.%, ZnO 5–50 mol.%, (PbO+$Tl_2O$ 20–55 mol.%; PbO+$Tl_2O$+ZnO 25–60 mol.%) and BaO 0–10 mol.%.

2. A sealing glass for laser glass according to claim 1 which is produced by adding $V_2O_5$ in an amount of 5–18 mol.%.

3. A sealing glass for the laser glass according to claim 1 which consists of: $P_2O_5$ 45–50 mol.%, PbO 25–35 mol.%; $Tl_2O$ 5–15 mol.%; ZnO 5–15 mol.%; $Al_2O_3$ 1–5 mol.%; $V_2O_5$ 5–15 mol.%.

* * * * *